United States Patent
Pfisterer

(10) Patent No.: US 7,843,319 B2
(45) Date of Patent: Nov. 30, 2010

(54) DEVICE AND METHOD FOR INDICATING THE ENGINE SPEED IN A MOTOR VEHICLE

(75) Inventor: Markus Pfisterer, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 327 days.

(21) Appl. No.: 12/032,330

(22) Filed: Feb. 15, 2008

(65) Prior Publication Data
US 2008/0197994 A1 Aug. 21, 2008

(30) Foreign Application Priority Data
Feb. 16, 2007 (DE) ............ 10 2007 007 631

(51) Int. Cl.
*B60Q 1/00* (2006.01)
(52) U.S. Cl. .................. 340/441; 340/438; 340/439
(58) Field of Classification Search ........... 340/439, 340/441, 456, 466, 467, 438; 701/51, 54, 701/59, 110; 477/107, 132
See application file for complete search history.

(56) References Cited

U.S. PATENT DOCUMENTS

| | | | |
|---|---|---|---|
| 4,631,515 A * | 12/1986 | Blee et al. ............... | 340/439 |
| 5,017,916 A * | 5/1991 | Londt et al. ............. | 340/870.13 |
| 5,272,632 A * | 12/1993 | Noguchi et al. .......... | 701/59 |
| 6,993,987 B2 | 2/2006 | Komura | |
| 7,174,241 B2 | 2/2007 | Tsuruhara et al. | |
| 7,660,656 B2 * | 2/2010 | Miyamaru et al. ....... | 701/51 |
| 2006/0287841 A1 | 12/2006 | Hoshi et al. | |

FOREIGN PATENT DOCUMENTS

| | | |
|---|---|---|
| DE | 10 2004 002 887 A1 | 7/2004 |
| DE | 10 2004 045 460 A1 | 5/2005 |
| DE | 10 2004 033 003 A1 | 1/2006 |
| DE | 11 2004 001 554 T5 | 6/2006 |

OTHER PUBLICATIONS

German Search Report dated May 7, 2007 w/English translation of pertinent portion (nine (9) pages).

\* cited by examiner

*Primary Examiner*—Van T. Trieu
(74) *Attorney, Agent, or Firm*—Crowell & Moring LLP

(57) ABSTRACT

A device and method for indicating the engine speed of a motor vehicle is provided. The engine speed in a motor vehicle is displayed, during a gear speed change via an engine speed signal, which is independent of the detected engine speed signal that is output as the engine speed signal, which is to be displayed, to the engine speed display module by way of an electronic transmission control module in the vehicle.

12 Claims, 2 Drawing Sheets

DEVICE AND METHOD FOR INDICATING THE ENGINE SPEED IN A MOTOR VEHICLE

CROSS REFERENCE TO RELATED APPLICATIONS

This application claims priority under 35 U.S.C. §119 to German Patent Application No. 102007007631.4, filed Feb. 16, 2007, the entire disclosure of which is herein expressly incorporated by reference.

BACKGROUND AND SUMMARY OF THE INVENTION

The invention relates to a device and a method for indicating the engine speed in a motor vehicle, having a sensor, which detects the actual engine speed, at least one electronic module, which processes the detected engine speed signal, and an engine speed display module, which is operatively coupled with the electronic module in order to display an engine speed.

Such a device is known, for example, from German patent document DE 10 2004 033 003 A1. According to this known device, there exists an engine speed indicator, which does, in fact, try to adapt this display to certain operating conditions in the motor vehicle, such as during a gear change. However, this prior art display always proceeds from the detected or measured speed and processes it correspondingly. Owing to such a manipulation of the measured speed, radical deviations from the actual speed can be displayed, a feature that can irritate the driver.

The invention provides a device of the aforementioned type, which provides a true correlation between the planned speed characteristics during a gear change and the displayed speed. A method for indicating the engine speed in a motor vehicle is also provided.

The device according to the invention for indicating the engine speed exhibits a sensor, which detects the actual engine speed; an electronic module, which processes the detected engine speed signal; and an engine speed display module. The engine speed display module can be integrated, for example, into a so-called instrument cluster. The electronic module can be integrated, for example, into an internal combustion engine control unit or a transmission control unit or also into the instrument cluster. In order to indicate the engine speed, the engine speed display module acquires from the electronic module in a manner that is well known the engine speed that is to be displayed. In addition, the detected engine speed signal may be displayed, modified or unmodified, via a connection of the electronic module with the display module.

However, in a radical departure from the prior art devices for indicating the engine speed, an engine speed signal, which is independent of the detected engine speed signal, is output, according to the invention, by way of an electronic transmission control module in the vehicle during a gear speed change. The gear change start is defined, preferably upon passage of a delay time following an electronic command to initiate a gear change. In this case, the delay time corresponds, in particular, to the dead time of the hydraulics and the remaining actuators prior to the actual gear change, which leads then to an engine speed change. However, in a preferred embodiment, the start of a predetermined nominal engine speed characteristic for a gear change control may also be defined as the gear change start.

There already exist at least internally electronic transmission control modules, for example, in the form of stand-alone control units for automatic transmissions or for automated transmissions, which specify a nominal engine speed characteristic during a gear change.

By way of the invention, a correlation between the subjective gear change impression and the displayed speed characteristic can be produced.

Other objects, advantages and novel features of the present invention will become apparent from the following detailed description of the invention when considered in conjunction with the accompanying drawings.

DETAILED DESCRIPTION OF THE DRAWINGS

Figure 1:
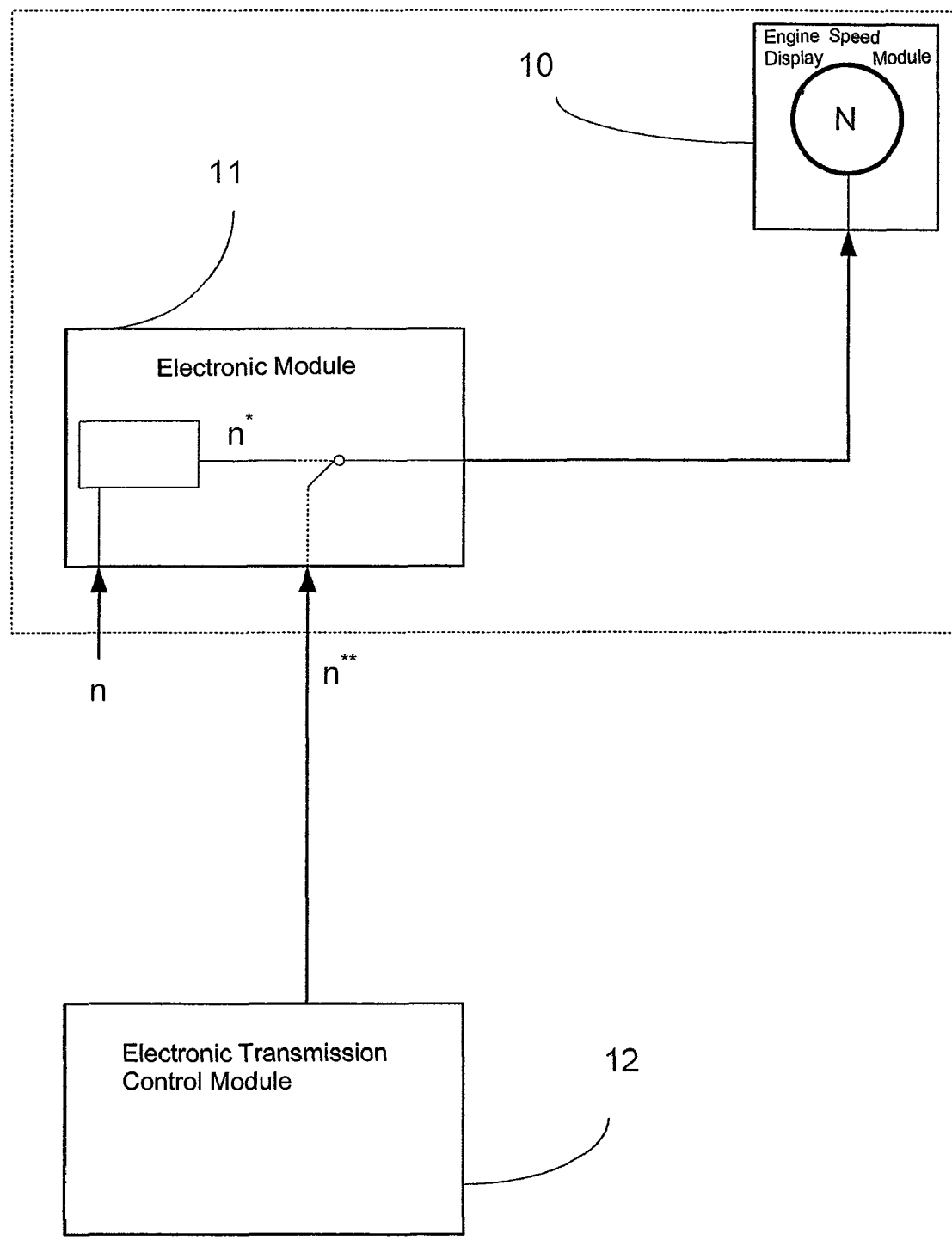
FIG. 1 is a schematic block diagram overview of the entire system according to the invention.

FIG. 1 depicts an engine speed display module 10 for displaying an engine speed N in a motor vehicle. The engine speed display module 10 is connected to an electronic module 11, for example, by way of a databus. The electronic module 11 detects, by way of a sensor (not illustrated here in detail) or by way of the connection to another control unit, the actual engine speed n as an input signal to the electronic module 11. The detected engine speed signal n can be processed in a manner that is well known into an engine speed signal n*, which is, for example, filtered and thus attenuated against extreme fluctuations. Basically, the electronic module 11 can provide this processed engine speed signal n* (or also the detected engine speed signal n) as the engine speed N, which is to be displayed, to the engine speed display module 10 by way of the databus connection.

The electronic module 11 can be, for example, a part of an engine control unit or an instrument cluster. The engine speed display module 10 can be, for example, a part of an instrument cluster.

Furthermore, the vehicle has an electronic transmission control module 12, which can be, for example, a part of an engine control unit or a stand-alone transmission control unit. The transmission control module 12 is also connected, for example, to the electronic module 11 by way of a databus. In addition or as an alternative, the transmission control unit 12 could also be connected directly to the engine speed display module 10 (which connection is not illustrated here).

Figure 2:
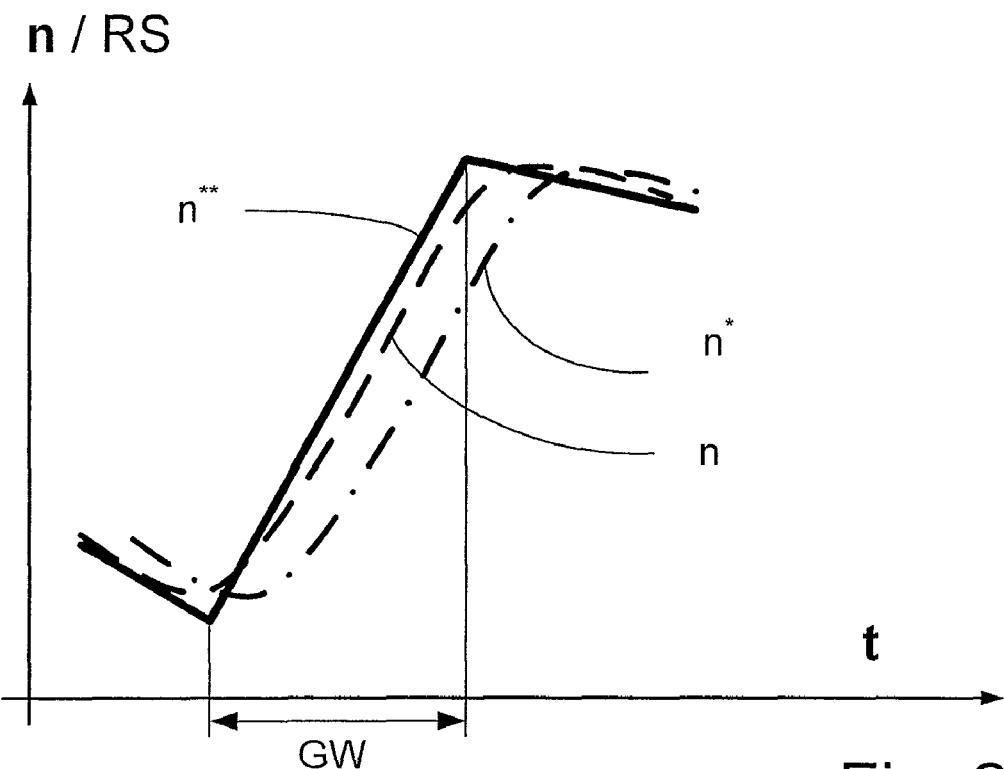
FIG. 2 is a graph depicting the engine speed signal according to the invention as compared to engine speeds, according to the prior art, for back shifting.
Figure 3:
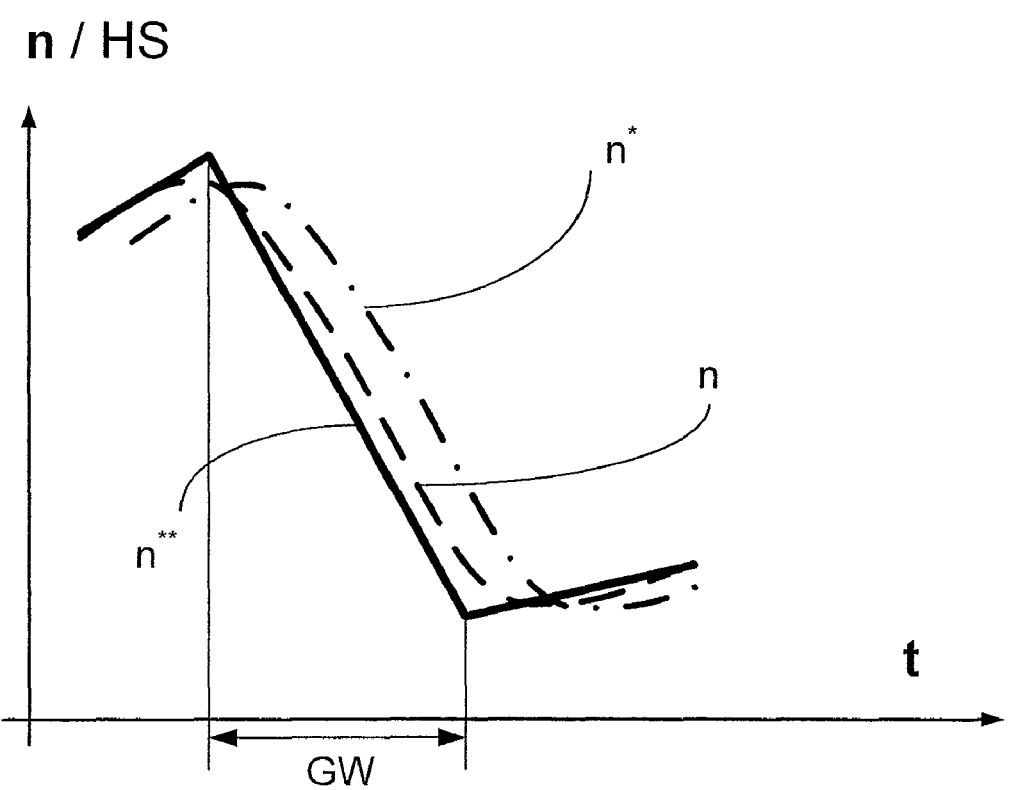
FIG. 3 is a graph depicting the engine speed signal according to the invention as compared to engine speeds, according to the prior art, for up shifting.

Preferably, a gear change signal is produced during a gear change (GW) (see also FIGS. 2 and 3). According to FIG. 1, the gear change signal is transmitted, as the signal n, from the transmission control module 12 to the electronic module 11. The signal n is preferably a nominal speed characteristic, which is predetermined in the transmission control module 12. The actuators of an electronically controlled transmission are controlled as a function of this nominal speed characteristic during a gear change.

As also depicted in FIGS. 2 and 3, this signal n** is output (instead of an engine speed signal n or n*, which is dependent on the measured engine speed n) to the engine speed display module 10 in the form of a nominal speed characteristic during a gear change GW during both a back-shift RS and during an up-shift HS of the transmission. According to FIG. 1, for example, the signal n is provided through the electronic module 11. It could also be output (not illustrated here), as an engine speed signal N, which is to be displayed during a gear change, directly to the engine speed display module 10**.

As an alternative to the embodiment illustrated here, the gear change signal, output by the transmission control module 12, could be only a signal which renders the start and, if desired, also the duration of the gear change GW detectable. In this case, in the presence of this signal, the electronic module 11 or the engine speed display module 10 itself could generate an engine speed signal n** that is independent of the detected engine speed signal n and which is determined, for example, empirically and conforms with the stored rules during a gear change.

For comparison purposes, FIGS. 2 and 3 depict, in addition to the gear change signal n**, the detected engine speed n and the engine speed n*, which is processed in the usual way, in accordance with the prior art. This comparison shows that immediately after the driver makes a request, the display according to the invention of the gear change signal n** confirms in an optical manner to the driver the immediate implementation of his request.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for indicating an engine speed in a motor vehicle, comprising:
   a sensor for detecting an actual engine speed;
   at least one electronic module operatively configured to receive the actual engine speed, the electronic module providing a detected engine speed signal;
   an engine speed display module operatively coupled with the electronic module in order to display the detected engine speed signal; and
   an electronic transmission control module operatively configured to generate a gear change signal during a gear change, said gear change signal being detectable by at least one of the electronic module and the engine speed display module; and
   wherein during the gear change, the engine speed display module displays an engine speed based on an engine speed signal, which is independent of the detected engine speed signal.

2. The device according to claim 1, wherein the gear change signal indicates at least a start of a gear change, wherein upon detecting the start of the gear change in the electronic module or the engine speed display module, the engine speed signal which is independent of the detected engine speed signal is generated by the electronic module or the electronic transmission control module.

3. The device according to claim 2, wherein the gear change signal reproduces a nominal speed characteristic, which is predetermined in the transmission control module and which is displayable by the engine speed display module as the engine speed which is independent of the detected engine speed signal.

4. The method according to claim 2, wherein the engine speed signal output from the electronic transmission control module is a gear change signal representing a nominal speed characteristic.

5. The device according to claim 1, wherein the gear change signal reproduces a nominal speed characteristic, which is predetermined in the transmission control module and which is displayable by the engine speed display module as the engine speed which is independent of the detected engine speed signal.

6. A method for displaying engine speed via an electronic module, which processes a detected engine speed signal, and an engine speed display module, which receives from the electronic module the processed engine speed signal, the method comprising the acts of:
   outputting a gear change signal via an electronic transmission control module in the vehicle during a gear change;
   detecting the gear change signal by at least one of the engine speed display module and the electronic module; and
   displaying by the engine speed display module during the gear change an engine speed based on an engine speed signal which is independent of the detected engine speed signal.

7. A method according to claim 6, wherein the gear change signal is a signal that outputs a start of the gear change, the method further comprising the acts of:
   detecting the start of the gear change in the electronic module or in the engine speed display module; and
   generating the engine speed signal independently of the detected engine speed signal by the electronic module or the electronic transmission control module.

8. The method according to claim 7, wherein the gear change signal reproduces a nominal speed characteristic, which is predetermined in the transmission control module and displayable by the engine speed display module as the engine speed based on an engine speed signal which is independent of the detected engine speed signal.

9. The method according to claim 7, wherein the engine speed signal output via the electronic transmission control module is a gear change signal rendering a start of a gear change detectable; and
   generating the displayed engine speed empirically upon receipt of the gear change signal.

10. The method according to claim 6, wherein the gear change signal reproduces a nominal speed characteristic, which is predetermined in the transmission control module and displayable by the engine speed display module as the engine speed based on the engine speed signal which is independent of the detected engine speed signal.

11. A method for indicating engine speed in a motor vehicle during a gear change of the motor vehicle, the method comprising the acts of:
   detecting an actual engine speed;
   outputting an engine speed signal from an electronic transmission control module in the vehicle during a gear speed change; and
   displaying an engine speed based on the engine speed signal output from the electronic transmission control module at least during the gear speed change, wherein the engine speed signal is independent of the detected actual engine speed.

12. The method according to claim 11, wherein the engine speed signal output by the electronic transmission control module is processed via an electronic module for display.

* * * * *